United States Patent
Meske et al.

(10) Patent No.: US 12,506,808 B1
(45) Date of Patent: Dec. 23, 2025

(54) METHOD FOR TRANSMITTING EVENT DATA FROM A FIELD DEVICE TO A REMOTE COMPUTING DEVICE, COMPUTER PROGRAM PRODUCT, FIELD DEVICE, AND SYSTEM

(71) Applicant: Knick Elektronische Messgeräte GmbH & Co. KG, Berlin (DE)

(72) Inventors: Christoph Meske, Berlin (DE); Hendrik Rathmann, Berlin (DE); Sven Wille, Berlin (DE)

(73) Assignee: Knick Elektronische Messgeräte GmbH & Co. KG, Berlin (DE)

( * ) Notice: Subject to any disclaimer, the term of this patent is extended or adjusted under 35 U.S.C. 154(b) by 0 days.

(21) Appl. No.: 19/203,215

(22) Filed: May 9, 2025

(51) Int. Cl.
*G06F 15/16* (2006.01)
*H04L 67/12* (2022.01)

(52) U.S. Cl.
CPC .................... *H04L 67/12* (2013.01)

(58) Field of Classification Search
CPC ....................................................... H04L 67/12
See application file for complete search history.

(56) References Cited

U.S. PATENT DOCUMENTS

| | | | |
|---|---|---|---|
| 2007/0244571 A1* | 10/2007 | Wilson | G05B 19/042 707/E17.005 |
| 2022/0327219 A1* | 10/2022 | Choi | G05B 19/4185 |
| 2023/0060849 A1* | 3/2023 | McLaughlin | G06F 11/327 |
| 2024/0160720 A1* | 5/2024 | Jasper | H04L 63/1425 |
| 2024/0202175 A1* | 6/2024 | Yanagita | G08B 21/182 |

* cited by examiner

*Primary Examiner* — Normin Abedin
(74) *Attorney, Agent, or Firm* — Smartpat PLC

(57) ABSTRACT

A method for transmitting event data (21), in particular operator event data and/or status event data, from a field device (2) to a remote computing device (3), includes: generating the event data (21) using the field device (2) on the basis of an event, providing an availability signal (22b), which signals the availability of the event data (21), for transmission (32) via a digital communication interface (15) to the remote computing device (3), and providing the event data (21) for transmission via the digital communication interface (15) to the remote computing device (3), the event data (21) being provided separately from the availability signal (22b). Computer program product, field device (2) for carrying out the above method, and system (1) including the field device (2).

19 Claims, 2 Drawing Sheets

METHOD FOR TRANSMITTING EVENT DATA FROM A FIELD DEVICE TO A REMOTE COMPUTING DEVICE, COMPUTER PROGRAM PRODUCT, FIELD DEVICE, AND SYSTEM

TECHNICAL FIELD

The disclosure relates to a method for transmitting event data, in particular operator event data and/or status event data, from a field device to a remote computing device. Furthermore, the disclosure relates to a computer program product comprising instructions which cause a computer to carry out a method of this type. The disclosure also relates to a field device configured to carry out a method of this type. Furthermore, the disclosure relates to a system having a field device of this type and/or a computing device of this type.

BACKGROUND

A field device for controlling and/or monitoring a production process, which records event data, namely operator event data and status event data, on a local storage medium, is known from prior public use. If necessary, a user can manually retrieve the event data from the field device, in particular by removing the storage medium from the field device. It is disadvantageous that the availability of the event data is limited, that retrieval is complex, in particular time-consuming and costly, and that manual data retrieval poses security risks.

SUMMARY

An object of the disclosure is to provide an improved method for transmitting event data, which in particular ensures high availability of the event data and is particularly efficient and secure in operation.

This object is achieved by a method for transmitting event data as disclosed and claimed. It has been found that the transmission of event data, in particular operator event data and/or status event data, from a field device to a remote computing device can take place via a digital communication interface, whereby the event data can be provided particularly efficiently, securely, and with high availability. The event data can be transmitted, in particular automatically, via the digital communication interface. For transmission, a data connection, in particular a wireless and/or wired data connection, to the remote computing device can be established via the digital communication interface. The remote computing device is preferably a master computer or central control device. The event data are preferably generated by the field device on the basis of an event. Providing the event data for transmission to the remote computing device via the digital communication interface ensures that manual retrieval of the event data on site, directly at the field device, and the associated effort can be avoided. Triggering of the transmission by the underlying event eliminates the need for manual retrieval steps, in particular ones carried out by a user. The transmission can thus be carried out particularly quickly after the event and efficiently. Delays resulting from a manual retrieval step can be avoided. By comparison with manual retrieval, automated provision and transmission via the digital communication interface is particularly secure, in particular tamper-proof.

The long-term or permanent storage or backup of event data preferably takes place centrally or in a remote data storage device, in particular the remote computing device. The field device preferably stores the event data only briefly or temporarily. To achieve this, the provision and/or transmission of the event data can be automated and be triggered by the underlying event, in particular ad hoc after the event. In other words, the event data are preferably held centrally and not in the field device. The terms long-term and short-term are to be understood in relation to one another. In particular, there may be a factor of at least 100, in particular at least 1000, between the durations of the long-term and short-term storage. Centralised storage, in particular in the computing device, makes particularly comprehensive security mechanisms possible, in particular by regularly creating copies of the event data and/or by way of effective firewalls and/or by locating the data storage device in a centralised manner. As a result in particular of the limited resources of the field device, corresponding security mechanisms on the field device would not be economically feasible or would only be possible with considerable additional effort.

Once generated, the event data can be stored in a buffer memory of the field device solely for the purpose of provision until transmission and/or stored, in particular exclusively, in a remote data storage device, particularly for the purpose of centralised saving.

Preferably, the event data are transmitted after the underlying event, in particular at the earliest possible time and/or as soon as suitable or favourable transmission conditions are present, for example as soon as transmission is possible without disrupting a prioritised data transmission and/or the required transmission capacity is available and/or between two cycles of a cyclic data transmission and/or after the transmission of higher-priority data, for example measurement and/or control data. In each of the aforementioned cases, the transmission is preferably already triggered by the underlying event.

Merging, in particular joint storage, of event data generated over more than 24 hours, especially over several days, preferably takes place, particularly exclusively, in a remote data storage device, in particular the computing device. The event data are particularly reliably secured in the central or remote data storage device.

Provision and/or transmission triggered by the event is also understood to mean that there may be a waiting period between the event and the provision and/or transmission, for example until the computing device and/or the data transmission system are ready to retrieve the event data. However, provision and/or transmission triggered in this way will occur in the short term and without any further steps to be carried out, in particular by a user.

Preferably, at least one, in particular all, of the method steps are automated. In particular, the method is triggered automatically by the event. In particular, the generation of the event data and/or the provision and/or transmission of the event data via the digital communication interface may be automated.

An availability signal, which signals the availability of the event data, may be provided for transmission via the digital communication interface to the remote computing device. The event data are preferably provided for transmission separately from the availability signal. The availability signal can be transmitted via the digital communication interface, in particular automatically, in particular to the remote computing device. The provision of the availability signal preferably takes place separately from the provision of the event data. The availability signal can be transmitted to the remote computing device, in particular before the event data are transmitted. As a result, the method can be used particularly flexibly, and data transmission can take place particularly efficiently.

The event data may be transmitted at regular intervals.

Field devices are generally used to perform measurement and/or control tasks. Preferably, a laboratory and/or production process is controlled and/or monitored using the field device. The exchange of measurement and/or control data with a remote computing device can be prioritised. The data transmission is robust but subject to specific conditions, and the transmittable data rate is often comparatively low. The availability signal, provided separately from the event data, ensures that in an environment of this type, in particular in the environment of the field device, efficient transmission of event data via the digital communication interface is possible.

Preferably, the event data and/or the availability signal and/or measurement data and/or control data are transmitted via the same digital communication interface, in particular via the same data connection between the field device and the remote computing device. These data may be provided at the same digital communication interface.

Providing the event data separately from the availability signal is understood to mean in particular that they are not provided in the same data packet and/or are not transmitted simultaneously, in particular not using the same data packet. By contrast, transmission via the same data connection is possible and is preferred. Preferably, the event data are transmitted, in particular retrieved by the remote computing device, after the availability signal has been provided, in particular after it has been transmitted to the remote computing device. This makes it possible for the event data to be transmitted at a time when the transmission capacity of the digital communication interface, in particular of the data connection, is sufficient for this purpose, or when the transmission of the measurement and/or control data is not disrupted. By contrast, the transmission of the availability signal is less problematic. The availability signal may for example consist of a single data bit. The availability signal may be transmitted in a data packet together with the measurement and/or control data, in particular regularly, in particular via cyclic data exchange. The data in this data packet are also referred to in the following as basic data. As a result, the method can be carried out particularly efficiently and used particularly flexibly.

The event data in each case describe a specific event, in particular an operating and/or status event. Measurement and/or control data are not considered event data in the present context. The events underlying the event data are preferably characterised in that they occur at a time which is unknown to the field device, in particular one which cannot be determined automatically. By contrast, measurement and/or control data are transmitted at regular and thus determinable times. Event data may comprise operator event data based on or caused by an operating action of a user, in particular on the field device, in particular on a user interface of the field device, in particular an input means, for example a keyboard and/or a touch-sensitive screen, and/or on the computing device, in particular relating to an operation release, a configuration change, a parameter change, a software update command, and/or status event data which relate to or are caused by a status, in particular a status change, in particular of the field device, in particular an error message and/or a measurement range exceedance and/or a limit value exceedance and/or operating status information and/or a maintenance status, in particular for predictive maintenance, a calibration event, and/or a software change, in particular a software update, and/or a hardware change, in particular a change or the connection or removal of a sensor unit and/or an actuator. The fact that the event data is operator event data is preferred, but optional.

Preferably, the field device and/or a sensor unit and/or an actuator unit are configured to transmit an identifier of the sensor unit and/or of the actuator unit to the field device. The event data may include this identifier. This makes it possible to record a hardware change automatically and in detail using the event data.

The digital communication interface via which the availability signal and/or a release signal are received may be an interface for wired and/or wireless data exchange.

The digital communication interface via which the availability signal is received is preferably configured as a network interface, in particular as an Ethernet interface and/or as a WLAN interface, in particular as an industrial WLAN interface, and/or as a WAN interface and/or as a data bus interface. The computing device may have a master function, in particular a permanent one, in the data bus. The field device may have a slave function, in particular a permanent one, in the data bus.

The cyclic data exchange of the measurement and/or control data preferably takes place with a cycle duration in a range from 10 µs to 5 minutes, in particular from 100 µs to 1 minute, in particular from 1 ms to 30 s, in particular from 10 ms to 10 s, in particular from 50 ms to 2 s.

The measurement and/or control data are preferably transmitted independently of the availability signal, in particular in separate data packets and/or with a time interval, in particular between these data packets.

The remote computing device is preferably located within a range of 1 m to 10 km, in particular 2 m to 1 km, in particular 5 m to 500 m, in particular 10 m to 100 m, from the field device. The distance is preferably measured along the data connection. A wired data connection is preferably present at least in portions, in particular over the entire connection route, between the field device and the remote computing device, in particular between their digital communication interfaces.

The field device may be signal-connected to a sensor unit and/or actuator unit. The field device and the sensor unit can form a measuring device. The field device and the actuator unit can form an actuator device.

The signal connection of the field device to the sensor unit and/or to the actuator unit may be wired and/or be configured to transmit energy and/or signals and/or have a plug-in connection, in particular for inductive transmission of the energy and/or signals.

This method is particularly suitable for efficient, reliable retrieval of event data in the context of an audit trail. In an audit trail, especially in the pharmaceutical industry, corresponding event data often need to be provided quickly and with high reliability. The advantages of this method are particularly relevant in this context.

The computing device preferably has a master function. The field device preferably has a slave function. The digital communication interface may be a data bus interface.

Preferably, a retrieval signal is provided by the remote computing device in response to the availability signal received at the computing device. In other words, the availability signal triggers the transmission of the event data, in particular immediately, in particular without checking further transmission requirements, or with a time delay, in particular if further transmission requirements are met, for example if the required transmission capacity, in particular of the digital interface and/or the field device and/or the computing device, is available.

The transmission of the event data and/or the availability signal between the field device and the computing device, in particular via the digital communication interface, may be encrypted. This makes the transmission particularly secure.

The provision and/or transmission of the availability signal and/or the event data is preferably triggered by the underlying event, in particular ad hoc after the event. There may be a time interval of at most 4 hours, in particular at most 1 hour, in particular at most 20 minutes, in particular at most 10 minutes, in particular at most 5 minutes, in particular at most 1 minute, in particular at most 30 seconds, in particular at most 10 seconds, in particular at most 1 second and/or at least 0.1 seconds, in particular at least 1 second, in particular at least 5 seconds, between the occurrence of the event and the provision and/or transmission of the availability signal and/or the event data. The time interval between the occurrence of the event and the provision and/or transmission of the availability signal is preferably shorter than that between the occurrence of the event and the provision and/or transmission of the event data. The event data can thus be transmitted at a time when the transmission of the measurement and/or control data is not impaired.

Preferably, a separate event data record is generated for each event.

Each event data record is preferably provided and/or transmitted from the field device to the computing device individually. Alternatively, multiple event data records may be transmitted in groups.

The event data, in particular each individual event data record, may be transmitted in segmented form in a plurality of data packets, in particular to reduce the data packet size.

The field device stores the event data, in particular the at least one event data record, in particular the plurality of event data records, in a data memory of the field device in particular only until they have been transmitted to the computing device.

In one aspect, the availability signal and/or the event data may be provided at a digital communication interface configured as a fieldbus interface, in particular as a Profibus interface and/or as an FF interface and/or as a HART interface and/or as a Profinet interface and/or as a Modbus interface and/or as a EtherNet/IP interface, and in particular may be transmitted via this interface to the remote computing device. Data transmission via a fieldbus is robust but subject to limitations. The method ensures efficient transmission of the availability signal and/or the event data via the fieldbus interface, in particular together with the measurement and/or control data. In particular, the measurement and/or control data and/or the availability signal may be transmitted via cyclic data exchange, in particular via cyclic read access of the computing device to the field device. The advantages of the method are particularly relevant if the digital communication interface is configured as a fieldbus interface. Alternatively, the digital communication interface may be configured as a network interface, and the data connection between the field device and the computing device may be configured as a network connection. The method has efficiency and security advantages for a network connection of this type.

In one aspect, the event data are transmitted via acyclic data exchange, in particular via acyclic read access of the computing device to the field device. As a result, the transmission, in particular cyclically, of the measurement and/or control data can remain substantially unaffected by the transmission of the event data. The acyclic data exchange of the event data preferably takes place at a lower, in particular at most halved, frequency by comparison with the cyclic data exchange and/or at most 100 times per second, in particular per minute, in particular per hour, in particular at most 10 times per hour, in particular at most 1 time per hour, in particular when considered over a period of 24 hours.

In one aspect, the event data and/or the availability signal may be provided for transmission and/or transmitted immediately after the event data have been generated. This is understood to mean in particular that there is a period of at most 24 hours, in particular at most one hour, in particular at most 10 minutes, in particular at most 60 s, in particular at most 30 s, in particular at most 10 s, in particular at most 1 s, in particular 0.5 s, between the generation of the event data and the provision and/or transmission of the availability signal.

Preferably, the provision and/or transmission of the availability signal may take place no later than the tenth, in particular no later than the third, in particular the next, cyclic data exchange between the field device and the computing device following the generation of the event data.

In one aspect, the provision of the availability signal is only terminated when all event data have been transmitted from the field device to the computing device. The availability signal may be deleted for this purpose. Deleting the availability signal may be understood to mean in particular that an availability parameter is set to a value which indicates a lack of availability of the event data. For example, the availability parameter may be set to a first state, in particular 1, when the event data are available and to a second state, in particular 0, when no event data are available. The availability parameter is preferably a binary parameter, in particular with a data bit length, in particular a Boolean parameter. As a result, the availability signal can be transmitted particularly efficiently, in particular together with the measurement and/or control data, in particular via cyclic data exchange. The availability signal, in particular the availability parameter, may carry additional information, for example whether a buffer memory of the field device for the event data is filled to a particular degree and/or completely, and/or whether repeated provision of particular event data is possible, in particular whether the event data are still available or have already been deleted, and/or whether the method for the automated provision of the event data in the field device is activated or deactivated, and/or the number of the available event data records and/or the data volume of the event data, in particular of the at least one event data record.

The field device preferably comprises a buffer memory for temporarily buffering the event data, in particular until transmission. The field device preferably stores the event data, particularly exclusively, in the buffer memory. The buffer memory may be permanently integrated into the field device, in particular in such a way that it cannot be removed non-destructively, or it may be configured to be replaceable. The event data are preferably provided and/or transmitted from the buffer memory, in particular directly from the buffer memory. The event data are preferably buffered in the buffer memory from being generated until being transmitted. The buffer memory is preferably configured to store at least 5, in particular at least 10, in particular at least 100, and/or at most 1000 sets of the event data. The buffer memory may be a non-volatile or a volatile data memory.

Preferably, the event data are transmitted, in particular from the buffer memory, using the "first-in first-out" principle.

The event data are preferably temporarily buffered in the field device, in particular in the buffer memory, in particular only until the transmission is successfully completed. Long-term data backup is preferably performed elsewhere, in other words not by the field device, but rather in particular centrally, in particular by means of the computing device, in particular in the computing device. Because the event data are stored centrally, their long-term storage is particularly secure, in particular tamper-proof and loss-proof.

In one aspect, the event data are generated on the basis of a change in a configuration, in particular a calibration and/or an adjustment, of the field device, in particular based on or triggered by an operating action of a user and/or based on an automated process, in particular an automated calibration process. The configuration change may relate to the processing of a measurement signal and/or a control signal.

In one aspect, the event data comprise an individual event identifier. The event identifier may be assigned individually and/or uniquely for each individual event, in particular for each event data record. For example, the event identifier may be an index number which consecutively numbers the individual events, in particular the event data records. The event identifier may be a check value, in particular a check number, on the basis of which the integrity of the event data, in particular of the relevant event data record, and/or the transmission of the event data can be determined. The check value may, for example, be a hash value generated on the basis of a single or multiple event data records. Multiple event data records may be linked to one another, in particular in the manner of a blockchain. The check value may also be an independent element of the event data, in particular in addition to the event identifier. This makes the method particularly robust and secure in operation.

Preferably, the event identifier, in particular the characteristic value and/or the check value, is used to check whether the event data received at the computing device were transmitted correctly. For example, it may be checked whether the received event identifier corresponds to an expected event identifier. In particular, the expected event identifier may be a check number which is 1 greater than the check number received with the last received event data. If the check shows that the event identifier deviates from the expected event identifier, an error is assumed, in particular a transmission error. The transmission can be repeated; in particular, the event data can be retrieved from the field device again. This procedure is preferably repeated until the transmission is successful and/or until a predetermined maximum number of repetitions is reached. In the latter case, data loss must be assumed, and can be logged.

In one aspect, the event data comprise a user identifier. In particular, those event data, in particular the event data records, which are based on an operator event comprise a user identifier. User authentication is preferably required before operation of the field device. The field device thus recognises the user identifier. Because the event data comprise the user identifier, it is possible to assign the event data, in particular the operator event data, in particular the configuration change data, to a specific user. The method is thus particularly tamper-proof.

Preferably, the method for providing the event data cannot be deactivated generally and/or by the customer or can only be deactivated after the user has been authenticated as a member of a restricted user group with authorisation specifically valid for this purpose, in particular as an administrator. Deactivation is preferably only carried out after the operator event for deactivation has been successfully transmitted to the computing device, in particular together with the user ID of the user who performed the deactivation. This makes the generation and handling of event data particularly reliable and tamper-proof.

The field device may comprise a timer for providing a time signal.

Preferably, the time signal, in particular a system time, of the field device, in particular the current time and/or the current date, cannot be changed by a user or can only be changed after the user has been authenticated as a member of a restricted user group with authorisation specifically valid for this purpose, in particular as an administrator. This makes the method particularly reliable and tamper-proof.

The event data may comprise a timestamp, in particular based on the time signal, and/or a field device identifier and/or an event category and/or event identification information and/or an event description and/or a function identifier. The timestamp indicates the time of the event. The field device identifier is preferably a unique identifier of the field device at which the event data are generated. The field device identifier may be permanently assigned to the field device, for example using a component of the field device, for example using the digital interface, for example in the form of unique interface identification information, and/or may be assigned to the field device by the user and stored in the field device. Typically, the same measuring and/or actuating device identifier is used under which the measuring and/or actuating device is listed in all the planning and documentation documents of the production plant. The event category may indicate the type of event, for example an operator event and/or a status event. The event identification information may be a value which uniquely identifies a specific event, in particular according to a predetermined coding. The event description may explain the event, in particular in human-readable text. The function identifier may assign the event to a specific function of the field device, for example to a specific measurement and/or control channel.

In one aspect, the event data may be generated and/or transmitted at least in part, in particular in whole, as human-readable text. This applies in particular to the event description and/or the user identifier. As a result, the event data can be processed particularly efficiently, in particular by a user.

Preferably, a time signal, in particular a system time, of the field device is synchronised, in particular by means of a synchronisation signal transmitted via the digital communication interface, in particular the fieldbus, in particular a fieldbus without pre-implemented time synchronisation, in particular by means of a synchronisation signal of the remote computing device. In particular, a time signal of the field device on which the time stamp is based may be synchronised. As a result, the event data can be precisely assigned to the time of occurrence of the event. The time signal of the field device may be adapted to the system time of the higher-level system, in particular the computing device, in particular in real time. The achievable accuracy is in the range of minutes, in particular seconds, in particular milliseconds. Conventional fieldbus standards do not provide a mechanism for time synchronisation. The synchronisation of the time signal may be implemented by cyclic or acyclic transmission of a correct time signal from the computing device to the field device. Synchronising the time signal makes it possible to specify a correct timestamp, in particular a correct date or time, for the associated event and thus improves the traceability of corresponding events.

In a further aspect, the human-readable text may be generated in one of several languages, in particular in accordance with a language setting. The language setting, in particular a language identifier, is preferably stored on the field device.

In one aspect, a confirmation of receipt regarding the transmitted event data is received. The confirmation of receipt is received in particular at the field device from the computing device, in particular via the digital communication interface, in particular the fieldbus interface. The confirmation of receipt may be provided via cyclic and/or acyclic data exchange. The method is thus particularly robust in operation.

In a further aspect, the transmitted event data are deleted from the field device on the basis of the confirmation of receipt. In particular, the event data, in particular each event data record, are only deleted once a relevant confirmation of receipt is available. The confirmation of receipt may be assigned to the relevant event data record using an identifier, in particular the event identifier, or without an identifier, in particular by assigning the confirmation of receipt to the most recently transmitted event data, in particular the most recently transmitted event data record.

Particularly preferably, the event data are transmitted only to particular computing devices, in particular to a single predetermined computing device, and/or the event data are deleted only as a result of a confirmation of receipt from particular computing devices, in particular a single predefined computing device. To achieve this, it may be necessary for the particular computing device to be digitally authenticated, in particular with a digital identifier and/or with a digital key, and/or to be connected to the field device via a particular, in particular physical or digital, connection. The particular computing device may be a Class 1 master.

Preferably, all event data records are each transmitted individually, in particular in succession, in particular at intervals in time, and/or deleted individually, in particular in succession, in particular at intervals in time. After the last event data record has been deleted, the availability signal may be deleted or its provision may be terminated.

In one aspect, the scope of information of the event data to be generated can be configured. In particular, the configuration can be carried out at the field device and/or via the digital communication interface, in particular the remote computing device, in particular stored in the field device. The scope of information determines the information comprised in the event data, in particular in each event data record. As a result, the scope of information can be adapted individually. The configuration may be carried out via a user interface of the field device and/or via a signal from the computing device. Preferably, predetermined configuration sets may be selected, in particular exclusively, for this purpose, each having a particular, different scope of information. Alternatively or additionally, the scope of information can be configured freely.

In a further aspect, it may be determined, in particular stored in the field device, which operating/status event data actually lead to the method being carried out, in particular to the event data being carried out, in particular trigger this automatically. In particular, this determination may be made for specific events and/or event groups, in particular in such a way that only operator events trigger the method being carried out. This configuration may be carried out on the field device and/or via the digital communication interface, in particular from the remote computing device, in particular stored in the field device. Preferably, predetermined configuration sets may be selected, in particular exclusively, for this purpose, each having a particular, different trigger condition. Alternatively or additionally, the scope of the trigger conditions can be configured freely.

A further object of the disclosure is to provide an improved computer program product for carrying out the above method.

This object is achieved by a computer program product comprising instructions which cause a computer to carry out the method described above.

The disclosure also relates to a computer-readable medium having a computer program product according to the above description stored thereon.

The advantages of the computer program product and computer-readable medium correspond to the advantages of the method described above. The computer program product and computer-readable medium are preferably developed on with at least one of the features described above in connection with the method.

A further object of the disclosure is to provide an improved field device, in particular for controlling and/or monitoring a laboratory and/or production process, which in particular ensures a high availability of event data and is particularly efficient, flexible and secure in use.

This object is achieved by a field device, in particular for controlling and/or monitoring a process, in particular a laboratory and/or production process, which is configured to carry out the method described above. The field device may have a computing unit for generating the event data and a digital communication interface for transmitting the event data, in particular the event data and the availability signal. The advantages of the field device preferably correspond to the advantages of the method, the computer program product and/or the computer-readable medium. The field device is preferably developed on with at least one of the features disclosed above in connection with the method, the computer program product and/or the computer-readable medium, and/or vice versa. The term control also includes closed-loop control, in particular where this term is not defined in greater detail.

Preferably, the field device is configured to exchange measurement data and/or control data and/or the availability signal and/or event data, in particular with the remote computing device, via the same digital communication interface.

The digital communication interface is preferably a fieldbus interface, in particular a Profibus interface and/or an FF interface and/or a HART interface and/or a Profinet interface. The field device may have at least one measurement interface and/or at least one control interface. The measurement interface may be configured to receive a measurement signal, in particular from a sensor unit. The control interface may be configured to output a control signal, in particular to an actuator unit.

The field device may have a user interface, in particular comprising a display means, in particular a screen, and/or an input means, in particular a keyboard, and/or an interface, in particular analogue and/or digital, for a means for actuating user inputs.

The computing device preferably comprises a processor for processing digital data. The computer program product may be stored in a data memory of the computing device.

The disclosure also relates to the remote computing device. This is preferably developed on with at least one of the features described above in connection with the method, the computer program product, the computer-readable medium and/or the field device. The advantages of the computing device correspond to the advantages described above.

Another object of the disclosure is to create an improved system.

This object is achieved by a system having at least one, in particular a plurality of, field devices according to the above description and at least one, in particular a plurality of, remote computing devices, in particular according to the above description. The at least one computing device may be a master computer and/or a central control device. The system may have at least one sensor unit and/or at least one actuator unit. The advantages of the system correspond to the advantages described above. The system is preferably developed on with at least one of the features described above in connection with the method, the computer program product, the computer-readable medium, the field device and/or the computing device.

BRIEF DESCRIPTION OF THE DRAWINGS

Further features, details, and advantages of the invention will become apparent from the following description of an example embodiment with reference to the drawings, in which.

DETAILED DESCRIPTION

Figure 1:
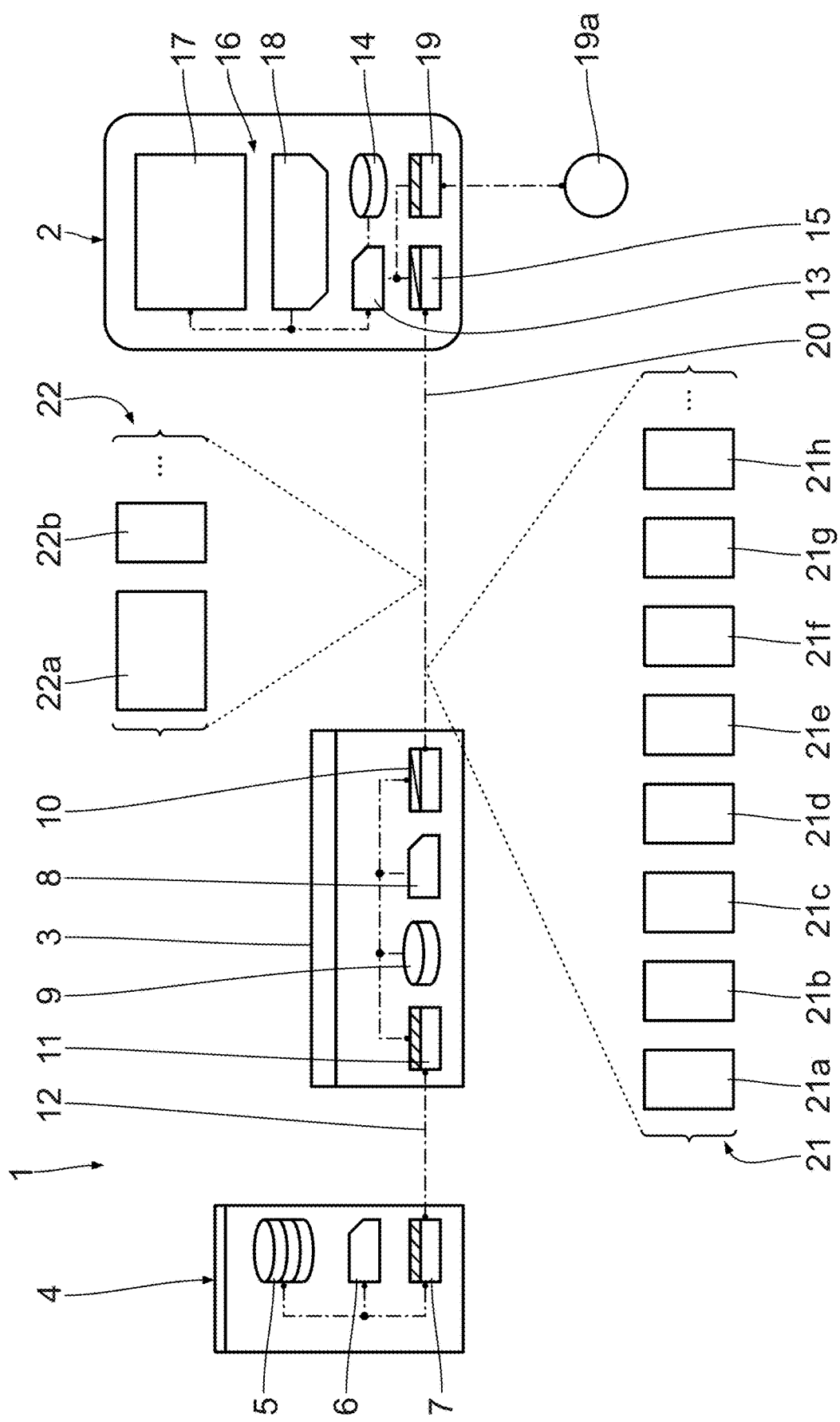
FIG. 1 is a schematic representation of a system comprising a field device for controlling and/or monitoring a laboratory and/or production process and a remote computing device which is in signal-transmitting connection with the field device, in particular via a digital communication interface, in particular a fieldbus interface.

A system 1, comprising a field device 2 and a remote computing device 3, and a method for transmitting event data 21 from the field device 2 to the computing device 3 are described with reference to FIGS. 1 and 2. The system 1 may comprise a plurality of the field devices 2 and/or a plurality of the computing devices 3. Preferably, the computing device 3 is a master computer and/or a terminal.

The system 1 may comprise a data centre 4, which may also be referred to as a central computing device. The data centre 4 preferably comprises a central database 5, a processor 6, and a digital communication interface 7, in particular a network interface. The processor 6 is in signal-transmitting communication with the central database 5 and the digital communication interface 7. The data centre 4 is configured to store event data received via the digital communication interface 7 in the central database 5.

The computing device 3 comprises a processor 8, a data memory 9, and a digital communication interface 10, in particular a data bus interface, in particular a fieldbus interface, in particular a Profibus interface. The computing device 3 preferably further comprises an additional digital communication interface, in particular a network interface. The computing device 3 and the data centre 4 are in signal-transmitting communication via the digital communication interface 7 and the additional digital communication interface 11. In particular, a network connection 12 is present between the computing device 3 and the data centre 4. The event data can be transmitted from the computing device 3 to the data centre 4 via this network connection.

The field device 2 has a processor 13, a data memory 14, and a digital communication interface 15, in particular a data bus interface, in particular a fieldbus interface, in particular a Profibus interface. Furthermore, the field device may have a user interface 16, in particular comprising a display means 17, in particular a screen, and an input means 18, in particular a keyboard. The field device 2 may also comprise a measurement interface 19 and/or a control interface (not shown). The measurement interface 19 is configured to receive signals from a sensor unit 19a. The measurement interface 19 may comprise a measuring transducer. The processor 13 is in signal-transmitting connection with the data memory 14, the digital communication interface 15, the user interface 16, in particular the display means 17 and the input means 18, the measurement interface 19 and/or the control interface.

The field device 2 is in signal-transmitting connection with the computing device 3, in particular via the digital communication interfaces 10, 15. A digital data connection 20, in particular a single one, in particular configured as a fieldbus, in particular as a Profibus, is present between the field device 2 and the computing device 3.

The digital data connection 20, in particular the fieldbus connection, is preferably configured in such a way that data exchange can take place cyclically and/or acyclically. Preferably, the computing device 3 has a master function and the field device 2 has a slave function.

Figure 2:
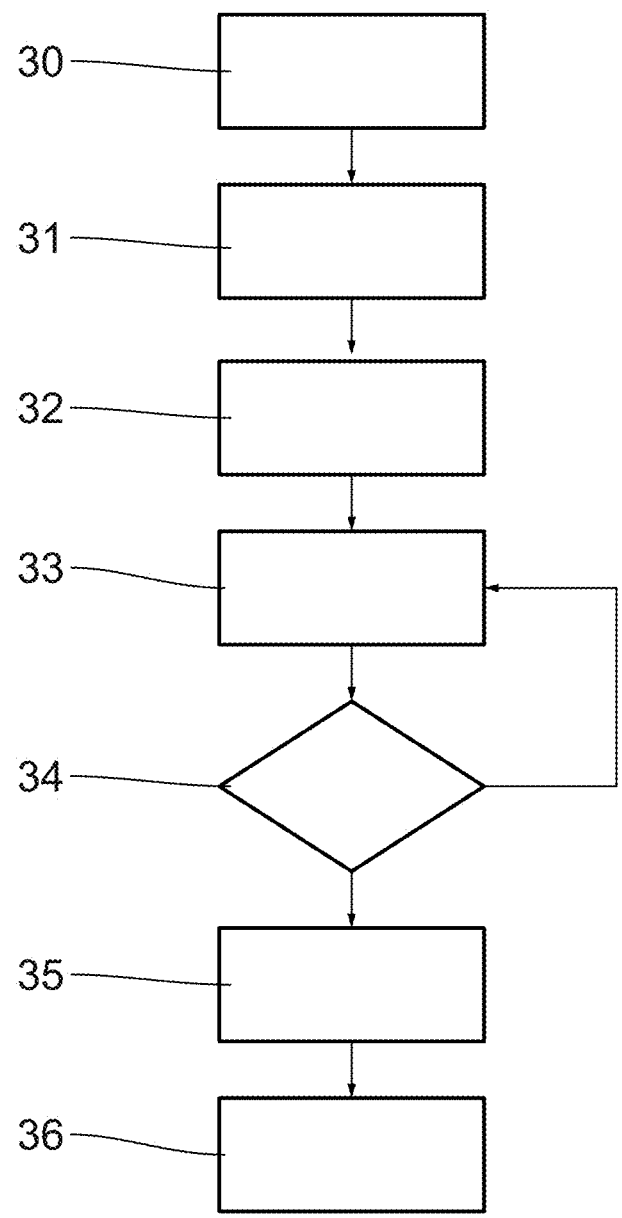
FIG. 2 is a flowchart showing method steps carried out by the field device and/or the remote computing device.

The event data 21 transmitted from the field device 2 to the computing device 3 are shown schematically in FIG. 1. The event data 21 preferably comprise a unique event identifier 21a, a timestamp 21b, a field device identifier 21c, an event category 21d, event identification information 21e, an event description 21f, a function identifier 21g, and/or a user identifier 21h. The event can be uniquely identified using the unique event identifier 21a. The timestamp 21b indicates the time when the event occurred, in particular the day, hour and minute. The field device identifier 21c is a unique identifier of the field device 2 at which the event occurs or is detected or in which the event data 21 is generated. The event category 21d indicates a category under which the event falls, for example, whether the field device 2 was operated, whether an error occurred, for example a control error and/or a measurement error and/or a measurement range exceedance and/or a defect which can be detected in particular by internal self-diagnosis and/or a connection interruption to the sensor unit 19a and/or other external components and/or a configuration error, for example due to contradictory parameters set by the user, and/or whether an operation release occurred and/or whether a configuration of the field device 2, in particular a parameter, was changed and/or whether the field device 2 triggered an action, for example cleaning of the sensor unit 19a, in particular in accordance with a time- and/or monitoring-based control, and/or automatic calibration. The event identification information 21e specifies the event in greater detail, in particular uniquely identifying the event, in particular on the basis of a predetermined coding. The event description 21e preferably comprises human-readable plain text which explains the event. The function identifier 21g may indicate a field device function affected by the event, for example a measurement function, in particular on a specific measurement channel, and/or a control function, in particular on a specific control channel, of the field device 2. The user identifier 21h indicates whether a user is associated with, in particular caused, the event, and if applicable which user. The user identifier 21h may be present as human-readable plain text, in particular including the user name, and/or as an encoded user identifier.

The event data 21 are available at least in part, in particular in whole, in machine-readable plain text, in particular being transmitted in plain text via the digital data connection 20.

The language in which the event data are present, in particular are generated, is preferably adjustable. A corresponding language setting may be stored in the field device 2, in particular in the data memory 14.

The functionality of the system 1, in particular of the field device 2 and the computing device 3, and of a method for transmitting the event data 21 from the field device 2 to the remote computing device 3 is described in the following.

The field device 2 is in an operating state. The measurement signals acquired by the sensor unit 19*a* are received at the measurement interface 19. From these, the field device 2 generates measurement data 22*a*, in particular taking into account calibration and/or adjustment parameters stored in the field device 2. The measurement data 22*a* are transmitted to the computing device 3 via the digital communication interfaces 10, 15.

Alternatively or additionally, control data may be exchanged between the field device 2 and the computing device 3 via the digital communication interfaces 10, 15, in particular received at the field device 2.

The transmission of the measurement data 22*a* from the field device 2 to the computing device 3 preferably takes place via cyclic data exchange.

An event occurs, in particular an operating and/or status event, and is detected by the field device 2, in accordance with step 30. As described above, the event is for example a change made by a user to a parameter for evaluating a measurement signal received by the sensor unit 19*a*.

A computer program product, comprising instructions which cause a computer, in particular the field device 2, in particular the processor 13, to carry out the method described in the following, is stored on the field device, in particular on the data memory 14.

In accordance with step 31, the field device 2 generates event data 21 which are based on the event, in particular describing it. The event data 21 comprise the unique event identifier 21*a*, the timestamp 21*b*, the field device identifier 21*c*, the event category 21*d*, namely that it is a parameter change, the event identification information 21*e*, the event description 21*f*, in particular in a language in accordance with the language setting, the function identifier 21*g*, namely that a first measurement channel of the field device 2 is affected, and the user identifier 21*h*, namely the name of the user who brought about the change.

An availability signal 22*b* is provided by the field device 2, and signals that the event data 21 are available for transmission, in particular in a provision memory of the field device 2, in particular the digital communication interface 15. The availability signal 22*b* is transmitted from the field device 2 to the computing device 3, in accordance with step 32, in particular via the digital communication connection 20. The transmission 32 preferably takes place via cyclic data exchange.

The availability signal 22*b* is preferably a component of basic data 22 which comprise the measurement and/or control data 22*a*. The transmission 32 of the availability signal 22*b* preferably takes place together with the measurement and/or control data 22*a*. The basic data 22 are preferably transmitted via cyclic data exchange between the field device 2 and the computing device 3.

The availability signal 22*b* may take on a first value when event data are ready to be transmitted, for example a value of 1, and a second value when no event data are ready to be transmitted, for example a value of 0, or vice versa.

The event data 21 are provided at the field device 2 for transmission to the computing device 3.

The computing device 3 determines that the availability signal 22*b* which signals event data 21 ready for transmission is present. The computing device 3, in its master function, initiates the transmission of the event data 21 from the field device 2 to the computing device 3 in accordance with step 33. The transmission 33 preferably takes place via acyclic data exchange, in particular via acyclic read access, in particular via read access of the computing device 3 to the field device 2, in particular to the digital communication interface 15. The acyclic transmission 33 of the event data 21 ensures particularly efficient communication between the field device 2 and the computing device 3.

In accordance with step 34, the computing device 3 checks whether the unique event identifier 21*a* corresponds to an expected event identifier. In the simplest case, the event identifier 21*a* is a number which consecutively numbers each event. On the basis of the event identifier 21*a* of the most recently transmitted event data 21, it is thus possible to determine which event identifier 21*a* the currently transmitted event data 21 should have. If the event identifier 21*a* does not match the expected event identifier, a transmission error may have occurred. The computing device 3 then initiates the transmission 33 of the event data 21 again. This process is repeated until event data 21 having the expected event identifier 21*a* are received at the computing device 3 and/or until a termination criterion is met, for example until a predetermined maximum number of transmission attempts for the same event data 21 is reached.

If the event identifier 21*a* of the received event data matches the expected event identifier 21*a*, the event data are stored in the computing device 3, in particular in the data memory 9. Preferably, the event data are transmitted to the computing centre 4 via the network connection 12 and stored there, preferably in the central database 5. The event data 21 can thus be stored in a particularly accessible and secure manner.

The transmission 33 of the event data 21 between the field device 2 and the computing device 3 and/or between the computing device 3 and the data centre 4 may be encrypted.

The event identifier 21*a* may comprise a verification function, for example in the form of a check number and/or a hash value. Alternatively or additionally, the event data 21 may comprise a separate check value.

After the event data 21 have been successfully saved, the computing device 3 provides a confirmation of receipt. The confirmation of receipt is transmitted from the computing device 3 to the field device 2, in accordance with step 35.

In response to receiving the confirmation of receipt, the field device 2 deletes the event data 21 from the provision memory and/or from the data memory 14 in accordance with step 36. If further event data 21 are present at the field device 2, these are provided, in particular transferred to the provision memory of the field device 2, in particular of the digital communication interface 15. This is continued until all event data 21 have been transferred 33 to the computing device 3 and preferably deleted 36 in response to a corresponding confirmation of receipt being received.

If no event data 21, in particular no further event data which have not yet been transmitted, are available on the field device 2, the availability signal 22*b* is deleted or set to a value which signals that no event data 21, in particular no further event data, are available on the field device 2.

The method described above for transmitting 33 event data 21 from the field device 2 to the remote computing device 3 can be carried out in a particularly time- and cost-efficient manner. Manual retrieval of event data from field devices 2 by a user, in particular using a portable storage medium, is avoided.

The event data 21 are also available particularly flexibly. This is advantageous in particular if they are needed promptly. The method is therefore particularly advantageous if the relevant event data 21 need to be accessed at short notice as part of a process review, for example an audit trail.

Furthermore, the method ensures particularly secure transmission 33 of the event data 21. Tampering attempts and data loss are prevented in particular in that the transmission 33 of the event data 21 can be fully automated, in particular can be automatically monitored, for example using the event identifier 21a, using the check value and/or by transmitting the confirmation of receipt. Manual extraction of the event data 21 from the field device 2, for example using a portable computer-readable storage medium, is avoided.

The system 1, in particular the field device 2 and/or the computing device 3, and the computer program product are, like the method, particularly economical, time-efficient and secure in operation, and ensure a high availability of the event data 21.

What is claimed is:

1. A method for transmitting (33) operator event data (21) from a field device (2) to a remote computing device (3), comprising:
   controlling and/or monitoring a laboratory and/or production process by the field device (2);
   generating (31) the operator event data (21) using the field device (2) based on an operating action of a user on a user interface of the field device;
   providing an availability signal (22b), wherein the availability signal (22b) signals availability of the operator event data (21) for transmission (32) via a digital communication interface (15) to the remote computing device (3);
   transmitting (33) the availability signal (22b) via the digital communication interface (15) to the remote computing device (3) in a data packet;
   providing the operator event data (21) for transmission (33); and
   transmitting (33) the operator event data (21) via the digital communication interface (15) to the remote computing device (3) in a separate data packet,
   wherein providing the operator event data and transmitting (33) the operator event data (21) is automated and triggered by the operating action of the user, and
   wherein the operator event data (21), after being generated, is stored in a buffer memory of the field device (2) merely for providing the operator event data (21) for transmission (33) and, after the transmitting, the operator event data (21) is stored in a remote data storage device for centralized saving.

2. The method according to claim 1, wherein there is a time interval of at most 1 hour between the operating action of the user and transmitting of the operator event data.

3. The method according to claim 1,
   wherein the operator event data (21) are transmitted only to the remote computing device (3) after digitally authenticating the remote computing device (3) and/or via a designated physical and/or digital connection.

4. The method according to claim 1, wherein the field device (2) is used to perform measurement tasks or control tasks.

5. The method according to claim 1, wherein the availability signal (22b) and/or the operator event data (21) are provided on a digital communication interface (15) configured as a fieldbus.

6. The method according to claim 1, wherein the transmitting (33) the operator event data (21) is performed via acyclic data exchange.

7. The method according to claim 1, wherein the availability signal (22b) is provided at least until transmitting (33) the operator event data (21) is complete.

8. The method according to claim 1, wherein the operator event data (21) are generated in response to a change in a configuration of the field device (2).

9. The method according to claim 1, wherein the operator event data (21) comprise an individual event identifier (21a).

10. The method according to claim 1, wherein the operator event data (21) comprise a user identifier (21h).

11. The method according to claim 1, wherein transmitting (33) the operator event data (21) is performed at least in part as human-readable text.

12. The method according to claim 11, further comprising generating the human-readable text in one of a plurality of languages in accordance with a language setting.

13. The method according to claim 1, further comprising receiving a confirmation of receipt regarding the operator event data (21).

14. The method according to claim 13, further comprising deleting (36) the operator event data (21) from the field device (2) based on the confirmation of receipt, the confirmation of receipt being assigned to the operator event data (21) by an individual event identifier.

15. The method according to claim 1, further comprising configuring a scope of information of the operator event data (21) to be generated.

16. The method according to claim 1, wherein the operator event data (21) comprise a check value for determining an integrity of the operator event data (21).

17. A computer program product stored in a non-transitory memory comprising instructions which cause a computer to carry out a method for transmitting (33) operator event data (21) from a field device (2) to a remote computing device (3), the method comprising:
   controlling and/or monitoring a laboratory and/or production process by the field device (2);
   generating (31) the operator event data (21) using the field device (2) based on an operating action of a user;
   providing an availability signal (22b), wherein the availability signal (22b) signals availability of the operator event data (21) for transmission (32) via a digital communication interface (15) to the remote computing device (3);
   transmitting (33) the availability signal (22b) via the digital communication interface (15) to the remote computing device (3) in a data packet,
   providing the operator event data (21) for transmission (33) separately from the availability signal (22b); and
   transmitting (33) the operator event data (21) via the digital communication interface (15) to the remote computing device (3) in a separate data packet,
   wherein the operator event data (21) relates to a change in a configuration of the field device (2), wherein providing the operator event data and transmitting (33) the operator event data (21) is automated and triggered by the change in the configuration of the field device (2), and wherein the operator event data (21), after being generated, is stored in a buffer memory of the field device (2) merely for providing the operator event data (21) for transmission (33) and, after the transmitting, the operator event data (21) is stored in a remote data storage device for centralized saving.

18. A field device (2) for controlling and/or monitoring a laboratory and/or production process, comprising:

a computing unit (2) for generating event data (21), and a digital communication interface (15) for transmitting (32, 33) the operator event data (21), wherein the field device is configured to carry out the method according to claim 1.

19. The field device (2) according to claim 18, wherein the digital communication interface (15) is a data bus interface.

* * * * *